A. H. WAAGE.
EXPANSIVE SCREW ANCHOR.
APPLICATION FILED MAY 16, 1918.

1,302,609.

Patented May 6, 1919.

INVENTOR
Alvin H. Waage
BY
W. T. Criswell
ATTORNEY

UNITED STATES PATENT OFFICE.

ALVIN H. WAAGE, OF NEW YORK, N. Y.

EXPANSIVE SCREW-ANCHOR.

1,302,609.  Specification of Letters Patent.  Patented May 6, 1919.

Application filed May 16, 1918. Serial No. 234,910.

*To all whom it may concern:*

Be it known that I, ALVIN H. WAAGE, a citizen of the United States, and a resident of New York, in the county of New York and State of New York, have invented a certain new and useful Improvement in Expansive Screw-Anchors, of which the following is a full, clear, and exact specification.

This invention relates to a class of devices adapted to be used in conjunction with bolts, screws and the like.

My invention has for its object primarily to provide an anchor device which is of the expansive type designed to be employed for anchoring screws, bolts and like fasteners in stone and cement walls, ceilings and other supports in which the bolts and screws cannot be driven by the ordinary means so that various equipment and articles may be effectually applied removably to the supports, and which is of a form especially adapted to rigidly hold the bolts and screws against tendency to become weak when under the strain of laterally imposed pressure as well as when subjected to the strain of a direct load thereupon. The invention consists essentially of a tubular element adapted to be seated in a socket or recess provided in a support, and part of the passage of this element is threaded for reception of a screw or bolt. The exterior configuration of the tubular element is formed to provide a protruding annular shoulder or rib intermediate its ends, and adapted to be applied on the element as well as being inserted in the recess of the support is a sleeve member of ductile metal so that when compressed the tubular element will be tightly wedged in the support by engaging the wall of the recess, and by the annular shoulder of the tubular element being sunken in the sleeve member.

Another object of the invention is to provide a concentric bearing member of hard metal which is adapted to be arranged on the tubular element at the mouth of the recess of the support for serving to rigidly hold the screw or bolt in the tubular element against accidental lateral movement when under the strain of a load.

A further object of the invention is to provide a screw anchor of a simple and efficient construction which is susceptible of being made in any desired size and shape.

A practical embodiment of the invention is represented in the accompanying drawing forming a part of this specification in which similar characters of reference indicate corresponding parts in all the views, and will then be pointed out in the claim at the end of the description.

In the drawing, Figure 1 is a fragmentary view, partly in section and partly in detail, showing the manner of employing the device for anchoring a screw to a support.

Figure 1:
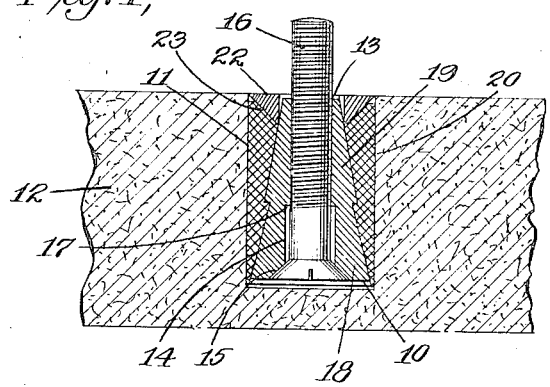
Figure 2:
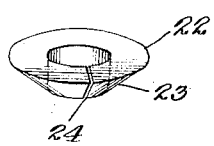
Fig. 2 is an enlarged perspective of the bearing member used in the device.
Figure 3:
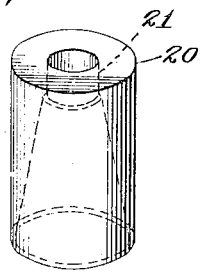
Fig. 3 is an enlarged perspective of the ductile sleeve member used in the device.
Figure 4:
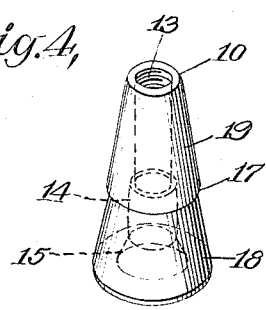
Fig. 4 is an enlarged perspective of the tubular element employed in the device.

The device or screw anchor has a tubular element 10 adapted to be seated in the socket or recess, as 11, of a support, as 12, which may be a stone or cement wall, or ceiling or the like, the recess being of a depth approximately similar to the length of the tubular element as well as being of a diameter slightly larger than the extreme diameter of the tubular element. Substantially one-half of the wall of the passage of the tubular element 10 is threaded, as at 13, while the second half, as 14, of the passage may be somewhat larger in diameter than the threaded portion, and the free end of the wall of this second half may be beveled, as at 15, to provide a tapered or flared part for accommodating the head of a bolt or screw, as 16, as will be hereinafter more fully explained. Centrally of the exterior configuration of the tubular element 10 is a protruding annular shoulder 17 which is preferably provided by forming the exterior in the fashion of a base cone, as 18, with a second cone, as 19, superimposed on the apex of the base cone, as illustrated, and the bottom of the second conoidal part of the tubular element may be smaller in diameter than the diameter of the bottom of the base conoidal part 18.

The tubular element 10 may be made of brass, steel or other hard metal, and adapted to be mounted on the exterior of the tubular element is a ductile sleeve member 20 of a diameter to fit closely to the wall of the recess of the support when applied on the tubular element. This sleeve member may be slightly shorter than the length of the tubular element, and this sleeve member is made of lead or other soft metal or composition so that when compressed it will conform to the exterior configuration of the tubular element, as well as snugly engaging the wall of the recess. One end part of the passage of the sleeve member 20 may be formed with a straight annular wall, as 21, of a diameter to fit closely to the exterior of the apex of the second conoidal part 19 of the tubular element 10, and the passage then tapers at a pitch similar to the taper of the remainder of the second conoidal part, besides tapering to a sharp edge at the second end of the sleeve so as to rest upon the base of the conoidal part 18 of the tubular element.

In order to hold a screw or bolt when anchored in a support against accidental lateral movement under the strain of a load, I provide a concentric bearing member, as 22. This concentric bearing member is preferably in the form of a ring of hard metal with a passage of a size sufficient to receive the apex of the conoidal part 19 of the tubular element 10, and the periphery of the ring or bearing member 22 tapers, as at 23, from the outer edge of its top to a sharp cutting edge at the wall of its passage at the bottom of the ring. The extreme diameter of the ring also corresponds to the diameter of the sleeve member 20, and this ring may be transversely slitted, as at 24, to allow the ring to expand if necessary.

To employ the anchor or device the screw or bolt is threaded in the tubular element 10 so that the head of the screw will be seated in flared part 15 of the tubular element, as illustrated in Fig. 1. The tubular element with the bolt is inserted in the recess 11 of the support 10 so that the conoidal part 18 of the tubular element and the bolt will rest on the bottom of the recess. The sleeve member 21 is then passed into the recess in an encircling fashion upon the tubular element so that the sharp lower edge of the sleeve member is disposed upon the exterior of the conoidal part 18 of the tubular element. The bearing member or ring 22 is afterward passed over the bolt and over the apex of the conoidal part 19 of the tubular element in a manner so that the sharp lower edge of the tapered periphery of the ring is in contact with the edge portion of the sleeve member adjacent to the tubular element. By then forcing the ring 22 inwardly of the recess of the support the ring will be sunken in the ductile sleeve member, and in turn the sleeve member will also be compressed for causing the sleeve member to conform with the exterior configuration of the tubular element, as well as causing the shoulder 17 to be sunken in the sleeve member. The bolt or screw will thereby be tightly wedged in the recess of the support to allow various equipment and articles to be fastened to the support, besides the bolt or screw being held to effectually withstand the strain of either a direct or lateral load which may be imposed thereupon.

In the foregoing description, I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope thereof.

Having thus described my invention, I claim as new and desire to secure by Letters Patent:—

The combination, in an expansive screw anchor, of an unyielding tubular element having one end portion of its passage threaded while the second end portion of the passage is flared, and the exterior configuration of said element being tapered from its interiorly flared end to its interiorly threaded end, an annular shoulder on the exterior of the tubular element intermediate its ends, provided by forming the lower part of the exterior in the fashion of a cone and forming the upper part of the exterior in the fashion of a second cone superimposed on the apex of the first mentioned cone, a ductile sleeve on the exterior of the tubular element, said sleeve having the wall of its passage tapered to conform with the taper of the second cone-shaped part of the tubular element as well as to overhang the annular shoulder of the element, and a split hard metal ring surrounding the apex of the second cone-shaped part of the tubular element as well as being on the top of the ductile sleeve and the exterior of the ring being beveled to a cutting edge in opposed relation to said ductile sleeve.

This specification signed and witnessed this 15th day of May A. D. 1918.

ALVIN H. WAAGE.

Witnesses:
E. W. JONES,
C. KAUFMAN.